US011152996B2

(12) United States Patent
Koskela et al.

(10) Patent No.: US 11,152,996 B2
(45) Date of Patent: Oct. 19, 2021

(54) REFINEMENT BEAM INDEX BEAM IDENTIFIER ASSOCIATION (71) Applicant: Nokia Technologies Oy, Espoo (FI)

(72) Inventors: Timo Koskela, Oulu (FI); Samuli Heikki Turtinen, Ii (FI); Sami-Jukka Hakola, Kempele (FI); Juha Pekka Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/336,590

(22) PCT Filed: Sep. 28, 2017

(86) PCT No.: PCT/IB2017/055977
§ 371 (c)(1),
(2) Date: Mar. 26, 2019

(87) PCT Pub. No.: WO2018/060928
PCT Pub. Date: Apr. 5, 2018

(65) Prior Publication Data
US 2020/0021350 A1 Jan. 16, 2020

Related U.S. Application Data (60) Provisional application No. 62/402,425, filed on Sep. 30, 2016.

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0639* (2013.01); *H04B 7/088* (2013.01); *H04W 16/28* (2013.01); *H04W 48/12* (2013.01)

(58) Field of Classification Search
CPC .... H04B 7/0695; H04B 7/0639; H04B 7/088; H04B 7/0617; H04B 7/0417; H04B 7/061;
(Continued)

(56) References Cited

U.S. PATENT DOCUMENTS

2013/0028340 A1* 1/2013 Yang .................... H04B 7/0639
375/260
2013/0137379 A1* 5/2013 Jung ..................... H04W 24/00
455/67.11
(Continued)

FOREIGN PATENT DOCUMENTS

EP 3476154 A1 5/2019
KR 20090077185 A * 7/2009
(Continued)

OTHER PUBLICATIONS

"Verizon 5G TF; Network and Signaling Working Group;Verizon 5th Generation Radio Access; 5G Medium Access Control Protocol (5G-MAC)Specification (Release 1)", Verizon, Cisco, TS V5G.321 v.1.0, Jun. 2016, pp. 1-40.
(Continued)

*Primary Examiner* — Michael K Phillips
(74) *Attorney, Agent, or Firm* — Squire Patton Boggs (US) LLP (57) ABSTRACT Various communication systems may benefit from appropriate designation of communication mechanisms. For example, fifth generation communication systems may use refinement beam index beam identifier association. A method can include determining, by an access node, an association between at least one reported refinement beam index and at least one logical beam index based on reception of a refinement beam index report. The method can also include providing the association to a user equipment.

12 Claims, 9 Drawing Sheets (51) Int. Cl.
*H04W 16/28* (2009.01)
*H04W 48/12* (2009.01)

(58) Field of Classification Search
CPC ...... H04B 7/0621; H04B 7/26; H04B 7/0421; H04W 16/28; H04W 40/248; H04W 72/0406; H04W 88/08; H04W 48/12
See application file for complete search history.

(56) References Cited

U.S. PATENT DOCUMENTS

| | | | |
|---|---|---|---|
| 2013/0235742 A1 | 9/2013 | Josiam et al. | |
| 2015/0024788 A1* | 1/2015 | Jung | H04W 24/10 455/456.5 |
| 2015/0373573 A1* | 12/2015 | Lee | H04W 76/27 370/329 |
| 2016/0183234 A1 | 6/2016 | Sung et al. | |
| 2016/0373180 A1* | 12/2016 | Guo | H04B 7/0695 |
| 2017/0207843 A1* | 7/2017 | Jung | H04B 7/0695 |
| 2017/0207845 A1* | 7/2017 | Moon | H04B 7/0695 |
| 2017/0346543 A1* | 11/2017 | Islam | H04B 7/0634 |
| 2019/0028173 A1* | 1/2019 | Zhu | H04B 7/0695 |
| 2019/0173562 A1* | 6/2019 | Yu | H04L 5/0094 |
| 2019/0174554 A1* | 6/2019 | Deenoo | H04W 56/001 |

FOREIGN PATENT DOCUMENTS

| | | | | |
|---|---|---|---|---|
| KR | 20170096929 A | 8/2017 | | |
| WO | WO-2013147505 A1 * | 10/2013 | | H04B 7/0632 |
| WO | 2015/106237 A1 | 7/2015 | | |
| WO | 2016/044994 A1 | 3/2016 | | |
| WO | WO-2017140374 A1 * | 8/2017 | | |
| WO | 2017/195082 A1 | 11/2017 | | |
| WO | 2017/204931 A1 | 11/2017 | | |
| WO | 2017/221202 A1 | 12/2017 | | |

OTHER PUBLICATIONS

"Verizon 5G TF; Air Interface Working Group; Verizon 5th Generation Radio Access; Physical layer procedures (Release 1)", Verizon, TS V5G.213, v1.4, Oct. 2016, 50 pages.

"Verizon 5G TF; Air Interface Working Group; Verizon 5th Generation Radio Access; Multiplexing and channel coding (Release 1)", Verizon, TS V5G.212, V1.5, Sep. 2016, 62 pages.

International Search Report and Written Opinion received for corresponding Patent Cooperation Treaty Application No. PCT/IB2017/055977, dated Jan. 17, 2018, 12 pages.

"Beam Grouping Evaluation for Beam Management", 3GPP TSG-RAN Working Group 1 meeting #90, R1-1712301, Agenda: 6.1.2.2.9, ZTE, Aug. 21-25, 2017, 10 pages.

"On Beam Grouping and Reporting", 3GPP TSG-RAN Working Group 1 meeting #88bis, R1-1705959, Agenda: 8.1.2.2.1, Nokia, Apr. 3-7, 2017, 12 pages.

Extended European Search Report received for corresponding European Patent Application No. 17855132.1, dated Apr. 8, 2020, 8 pages.

Office action received for corresponding European Patent Application No. 17855132.1, dated Feb. 11, 2021, 5 pages.

* cited by examiner

Figure 1

Prior Art

Figure 2

Prior Art

REFINEMENT BEAM INDEX BEAM IDENTIFIER ASSOCIATION

RELATED APPLICATION

This application was originally filed as Patent Cooperation Treaty Application No. PCT/IB2017/055977 filed Sep. 28, 2017 which claims priority benefit to U.S. Provisional Patent Application No. 62/402,425, filed Sep. 30, 2016.

CROSS-REFERENCE TO RELATED APPLICATION

This application is related to and claims the benefit and priority of U.S. Provisional Patent Application No. 62/402,425, filed Sep. 30, 2016, the entirety of which is hereby incorporated herein by reference.

BACKGROUND

Field

Various communication systems may benefit from appropriate designation of communication mechanisms. For example, fifth generation communication systems may use refinement beam index beam identifier association.

Description of the Related Art

Fifth generation (5G) new radio standardization work has started in the third generation partnership project (3GPP). Different transceiver architectures considered for 5G radio access system can include the following: digital, analogue or so-called hybrid, which utilizes a hybrid of digital baseband processing, such as multiple input multiple output (MIMO) and/or digital precoding. Although some aspects of the discussion herein are in the context of analogue beamforming, either fully analogue or hybrid transceiver, the techniques are applicable also for digital beamforming transceiver architecture.

Beamforming can be used to compensate for increased path loss when operating on higher frequencies, thereby providing cell coverage. The aforementioned transceiver architectures provide ways to implement beam forming in future systems depending on the cost and complexity limitations. As an example systems deployed to lower frequencies (~sub 6 GHz) may be implemented by using fully digital architecture, and the higher frequencies where the number of antenna elements required for cell coverage may range from tens to hundreds may be implemented by using hybrid-architecture, or even fully analogue architecture.

Figure 1:
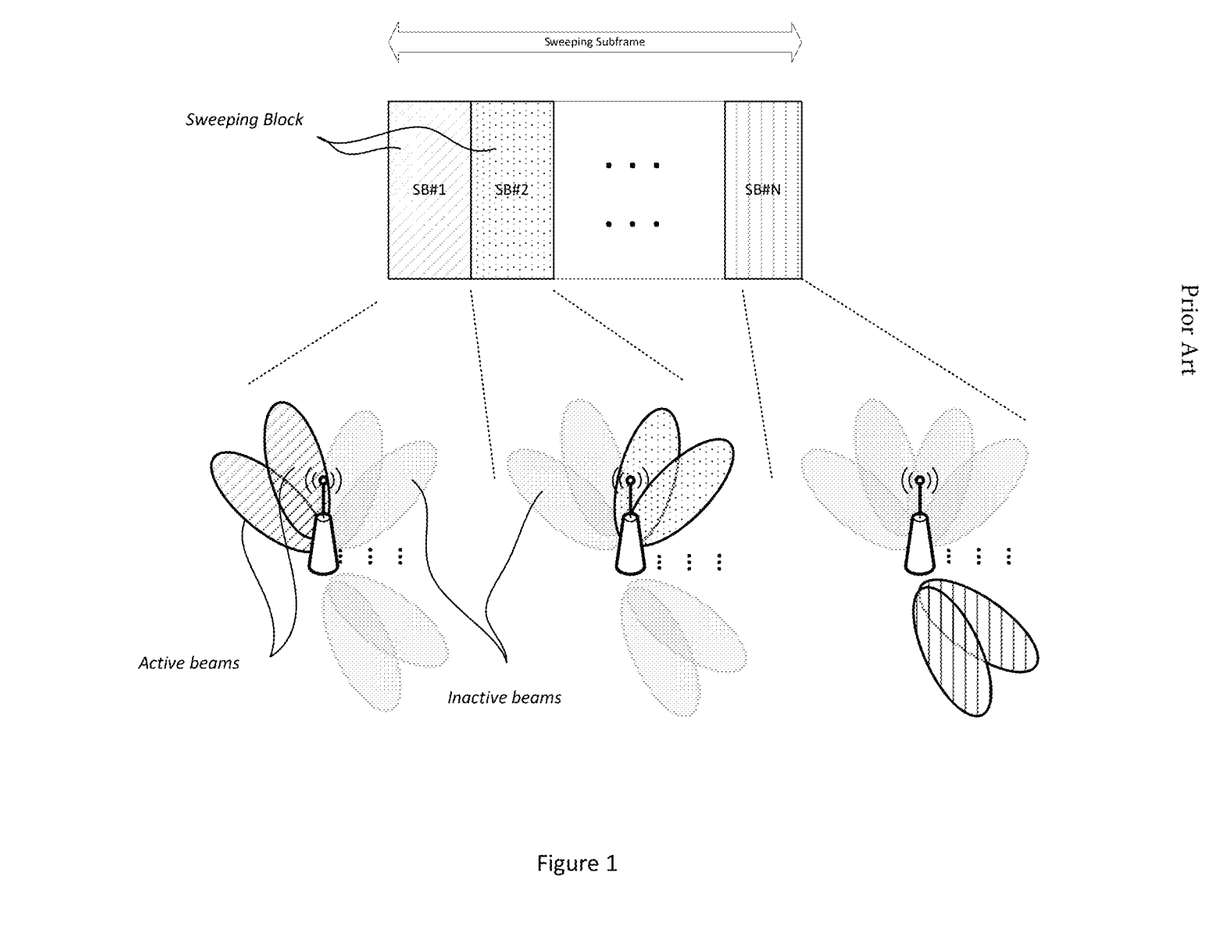
FIG. 1 illustrates a sweeping subframe.

FIG. 1 illustrates a sweeping subframe. In 5G a so-called sweeping subframe may be introduced to provide coverage for common control channel signaling with beam forming. A sweeping subframe can be made of sweeping blocks (SB) where a single block covers a specific area of the cell with a set of active beams. The total number of beams required to cover required cell area is typically much larger than the number of concurrent active beams the access point is able to form. Therefore access points need to sweep through the cell coverage area in the time domain by activating different set of beams on each SB.

As an example of downlink direction, if downlink common control channel coverage is provided by the sweeping subframe, each SB would carry essential cell access information such as DL synchronization signals, system information such as master information block (MIB), system information block (SIB), or the like including physical random access channel (PRACH)/random access channel (RACH) configurations, also paging or any control information that needs to be broadcasted in a cell. In the uplink direction the sweeping subframe/subframes may accommodate resources for random access channel or other uplink channels requiring periodic availability such as scheduling request (SR) and sounding reference symbol (SRS).

In a beam formed system where the cell coverage is provided by multiple beams, it may be beneficial to identify a single beam, for example by using beam-specific reference signals (BRS) enabling a UE to perform beam level detection/separation and perform measurement on beam specific measurements such as reference signal received power (RSRP), reference signal received quality (RSRQ), received signal strength indicator (RSSI), channel quality indicator (CQI) or the like. Identifying different beams may be beneficial for example when the UE indicates to the network the preferred communication beam during initial access or mapping a measurement to a common reference index when beam when reporting the measurements to network.

To identify a beam and derive the logical index for a beam, the following mappings can be made: for example if eight different BRS signals are transmitted per sweep block, the receiver is potentially able to measure eight different signal indices, either beams or beam indices. The same BRS signals may be reused in the next sweep block, thus the sweep block ID may be used to derive the logical beam IDs. With this example the logical beam index would be a function of sweep block index and the BRS signal index (or port index). Sweep block index may be explicitly signaled if the sweep block, for example sweep symbol or multiple symbols, convey also information such as MIB/SIB/downlink (DL) control (CTRL)/DL DATA, or the like. Or the sweep block may include a specific sequence to identify the block.

A UE may perform BRS signal level measurements on downlink sweep on 5G Node B (5G-NB) or in more general terms an access node or base station (BS) communication beams, such as detected BRS signals, and report the measurement results to 5G-NB. Alternatively or additionally network may also send additional reference signals for UE to measure and provide feedback. These reference signals may be beam refinement/training reference signals (BRRS/BTRS). Depending on the measured signals, different feedback may be used for BRS and BRRS measurements. For example, BRS measurements may be performed on the beam reference signals which can be directly associated by UE to specific beam index while the BRRS measurements may be performed on specific beam reference signals but the beams used to send the signals may not be known at the UE side. A 5G-NB may be able to map the measurement results on each reference signals to actual beam indices.

The UE may feed the measurement results back using physical layer signaling, such as physical uplink control channel (PUCCH), or higher layer signaling such as L2 (for example, medium access control (MAC)) or L3 (for example, radio resource control (RRC)) by transmitting a beam state information (BSI) report or in more general terms a beam report. A BSI report may include information such as (logical) beam index, beam RSRP, and/or beam RSRQ of all detected beams or N highest quality beams. The BSI report format may be limited by the used signaling method. For example, PUCCH may have a fixed/limited number of bits, whereas a MAC control element (CE) may have flexibility determined by the grant size. Depending on the measurement type, for example whether the measurement was made on BRS or BRRS or the like, the report format may be different. For example, when measuring BRS signals, the UE may explicitly detect the beam indices which the UE measures but in case of BRRS measurements the UE may only use the indices of detected beam specific reference signals. The report of BRRS measurements may be referred to as beam refinement information (BRI). The beam index space of BSI and BRI may differ in size.

In some scenarios, for example in inter-cell mobility reporting, the UE may also feed the Cell ID back to give provide context to the beam level measurements.

On higher frequencies, in addition to 5G-NB beamforming, the UE may also use beamforming. The UE may need to steer/form the UE's reception (RX) beam to multiple directions to determine the desired or highest quality communication beam/direction. The UE may measure several RX directions and determine which direction provides the highest quality based on predefined metrics. Such metrics may, for example, include RX direction which detected the highest RSRP of 5G-NB beam or the RX direction that detected the highest number of beams above a specific quality threshold.

The 5G-NB beam radiation patterns may overlap, for example, due to design to provide coverage, due to reflecting radio environment, or detection of a side lobe of another beam. As the 5G-NB beam radiation patterns typically overlap, UE may be able to detect multiple beams per RX direction. UE may then associate the detected 5G-NB beams per the UE's RX direction. Thus, the UE may group 5G-NB beams to potentially multiple groups. In one example, a special case is where UE maintains a group of 'one' so that one 5G-NB beam is associated to one UE RX beam. One beam in the group be, for example, a beam with the highest quality (for example, RSRP) measured by the UE.

Figure 2:
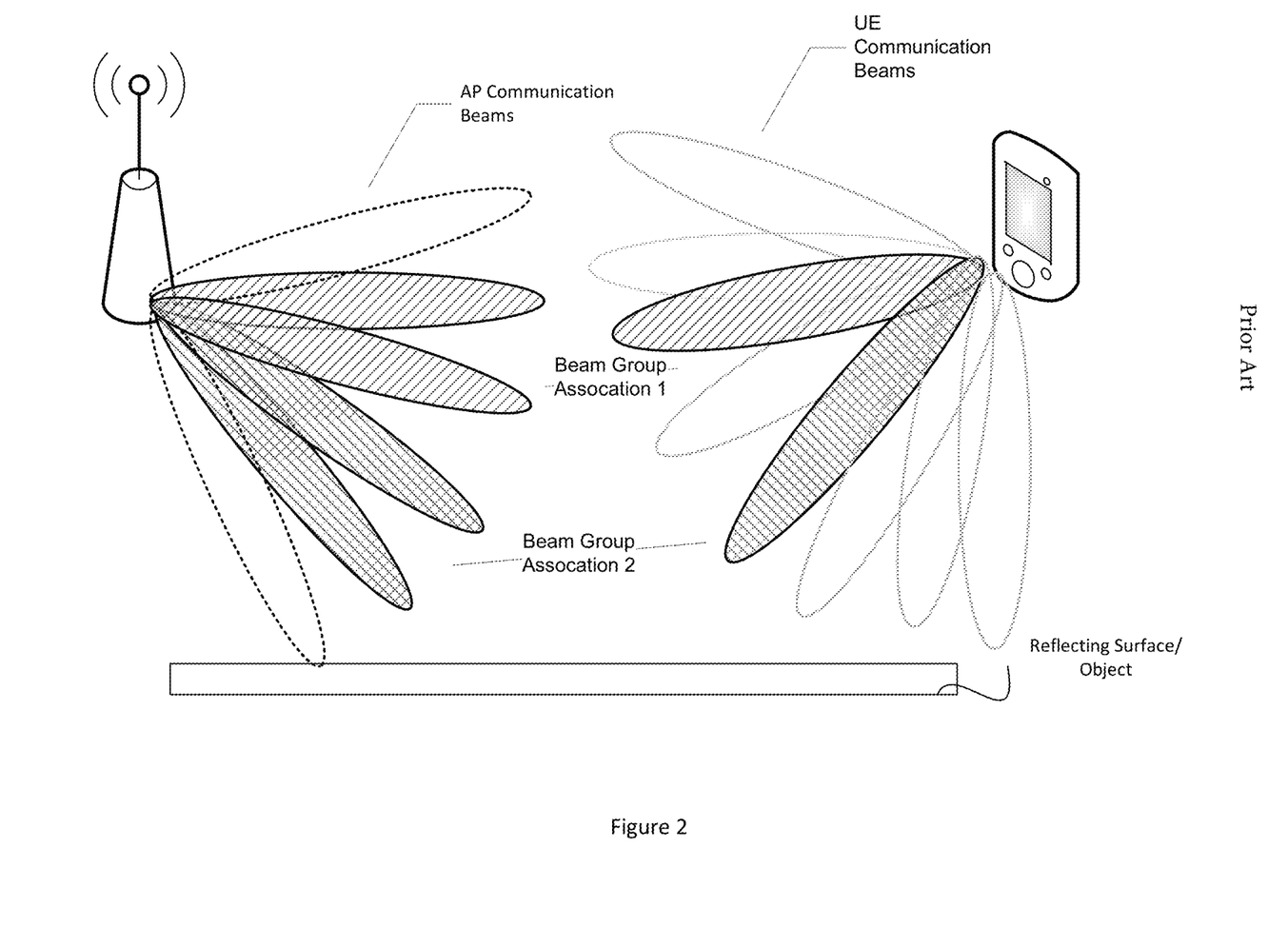
FIG. 2 illustrates beam group associations of a single or collocated TRPs or a cell.

FIG. 2 illustrates beam group associations of a single or collocated transmit-receive points (TRPs) or a cell. FIG. 2 illustrates beam grouping on high level. Based on the BRS measurements by different sets of RX beams, UE is able to determine association between a set of 5G-NB beams per the UE's RX direction. In case the UE is able to form multiple beams concurrently, for example two beams, the UE may group the detected 5G-NB beams per RX direction as one group.

FIG. 2 illustrates the grouping example by using a so called grid-of-beams but in one example UE may also form alternative beam radiation patterns, such as wider/narrower, and thus the UE may be able to detect different amount of 5G-NB beams but potentially may have reduced beamforming gain.

Figure 3:
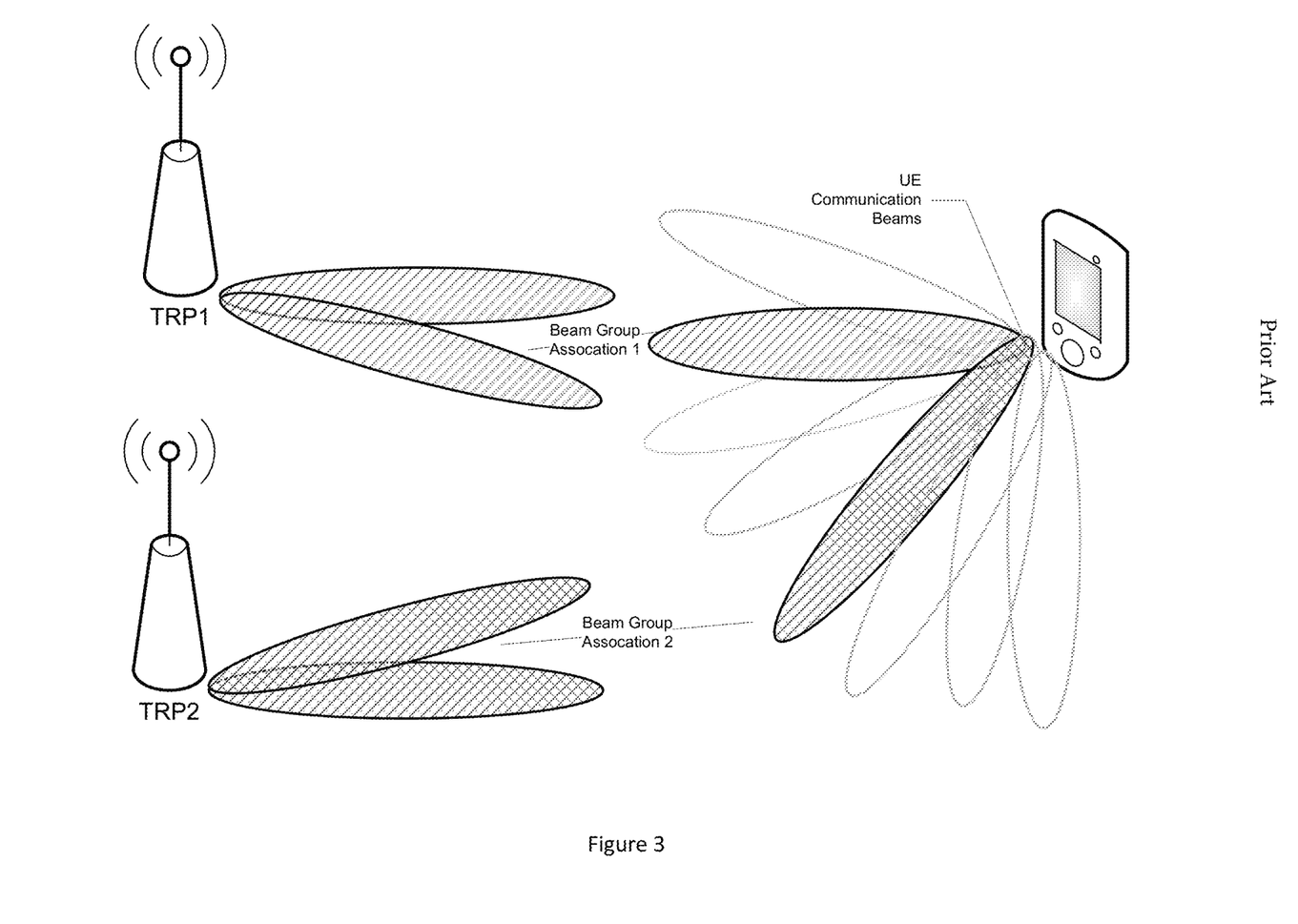
FIG. 3 illustrates association of beam groups from different TRPs of a cell.

FIG. 3 illustrates association of beam groups from different TRPs of a cell. Thus, FIG. 3 further illustrates the same example as FIG. 2 with non-collocated TRPs, whereas in FIG. 2 the TRPs may be collocated or a single TRP is used.

In addition to periodic BRS signals transmitted on a DL sweep, the network may schedule BRRS. The BRRS signals/resources can be pre-defined, and the UE knows what signals to measure based on the configuration. The BRRS signals may be used by UE to refine the UE's RX beam. For example, the UE can align the RX beam with base station (BS) beams, or determine which resource provided the best measurement result and provide feedback in similar manner as with BSI reporting done on BRS signals.

The network may preconfigure for example 0, 1, 2, . . . , N BRRS resources for a UE and indicate the transmission of the BRRS signals by explicit signaling, such as downlink control information (DCI) or MAC CE. Upon receiving an indication, the UE is able to determine which ports or BRRS signals the UE needs to measure. Pre-configuration may include configuration of multiple of BRRS resource sets which can be referred in the DCI by indicating a resource set configuration index to UE.

The BRRS configuration, including number of BRRS resources, can be done by the network (NW) using higher layer signaling such RRC or MAC signaling.

The BRRS signals are transmitted in UE-specific or UE group specific manner. The beam(s) used to transmit is determined dynamically by the network, for example based on the UE BSI feedback. Thus, the UE does not know which beams network is using to transmit the BRRS signals and thus the UE cannot use reporting of Beam Index-RSRP but can only refer to the measurement results using the BRRS index.

BRRS transmission is considered to be expensive in terms of resources, especially in a system utilizing hybrid architecture: transmitting BRRS signals is UE-specific and thus if the BRRS transmission occupies a specific set of resources, these cannot be used to communicate with other UEs. The scheduling of BRRS may be based on UE triggered signals: the NW grants the UE a way to signal a request for BRRS so that the UE can align the UE's RX beams accordingly or try to detect new beams. There is no guarantee that the NW is able respond to this request and schedule BRRS although requested by the UE. Also when the UE requests BRRS transmission the need may arise very quickly.

If the NW were to indicate to the UE beforehand which beams the NW may potentially use for transmitting the BRRS signals, such indication would potentially increase signaling overhead as the potential beams used for transmitting BRRS signals may vary over time, sometimes rapidly.

Currently, the UE reports the BRRS signals based on a refinement index, which is a logical index for the refinement signal resource but does not tell the actual logical beam index.

The UE may provide network feedback on the BRRS measurements using 5G physical uplink control channel (xPUCCH)/5G physical uplink shared channel (xPUSCH)/MAC signaling. The network may determine to switch a new serving beam for the UE based on the BRRS report by referring explicitly to a reported BRRS resource index or refinement beam index (RBI). This reference is done by DCI signaling, for example 1-bit to the highest reported BRRS resource, or by MAC CE using a 3 bit value 0, . . . , 7.

This index currently has no relation to actual logical BS beam index. Thus, the UE is only able to align the UE's own RX beam accordingly but has no knowledge of the current serving beam used by the BS. The UE has to assume that the serving beam has not changed. This assumption generates a problem when the UE tries to perform serving beam tracking and radio link monitoring: the UE has uncertainty of which beam is currently a serving beam. In the serving beam (a beam used for PDCCH, Physical Downlink Control Channel) tracking based on the BRS signals, UE determines the quality of the serving beam and compares it to other detected beams. By making this comparison the UE may detect the degradation of the current serving beam quality or the UE may detect a new, higher quality beam and report the new beam to the network. If the UE tracks the wrong serving beam during BRS periods on DL sweep, the wrong tracking may cause unnecessary recovery actions and potentially a radio link failure.

If the network were to explicitly indicate a new logical beam index after BRRS report, with the knowledge at the NW side, the UE would not know how to align the UE's own RX beam accordingly.

SUMMARY

According to a first embodiment, a method can include determining, by an access node, an association between at least one reported refinement beam index and at least one logical beam index based on reception of a refinement beam index report. The method can also include providing the association to a user equipment.

In a variant, the method can also include determining whether at least one serving beam for the user equipment has changed. The method can also include indicating to the user equipment that the at least one serving beam has changed, when a change is determined.

In a variant, the beam change is indicated using at least one of a medium access control based beam change, a downlink control information based beam change, and radio resource control signaling based beam change.

In a variant, the method can also include receiving the refinement beam index report prior to the determining.

According to a second embodiment, a method can include determining, by a user equipment, an association between refinement beam index and logical beam index based on information provided by an access node.

In a variant, the method can also include detecting if at least one serving beam has changed based on the determination.

In a variant, the method can include performing serving beam tracking based on the determination.

In a variant, the method can include performing serving beam tracking based on the detection.

In a variant, the method can further include determining whether the determined association is valid.

In a variant, the determining is based on a timer set by the user equipment.

In a variant, the method can further include, when the timer expires without receiving a beam change request from the access node, performing beam tracking assuming that a current serving beam is maintained.

In a variant, the method can further include sending a refinement beam index report to the access node, wherein the information provided by the access node is responsive to the refinement beam index report.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments provide multiple methods for beam switching after receiving a UE BRI report. For example, certain embodiments relate to a method that includes a network node, such as an access node, providing an association between a reported RBI index/indices and logical beam indices based on the reception of the BRI report and determining whether the UE serving beam or a set of serving beams has/have changed.

Moreover, certain embodiments relate to a method that includes a UE determining the association between RBI and BI based on the information provisioning of a network node, and determining if a serving beam/set of serving beams has/have changed. The method can further include determining by the UE whether the association is valid or not.

Various implementations of these methods are possible, for example relying on MAC based beam change, DCI based beam change, and RRC signaling based beam change.

Figure 4A:
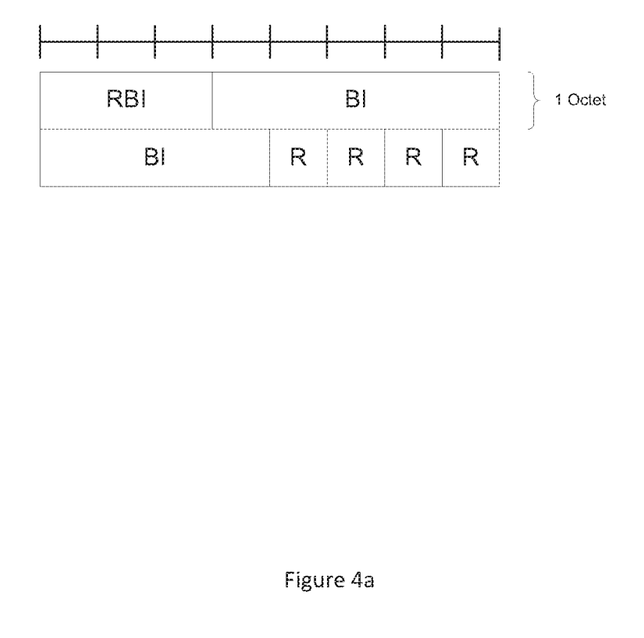
FIG. 4a illustrates a MAC CE providing a single beam index (BI) to refinement beam index (RBI) association, according to certain embodiments.
Figure 4B:
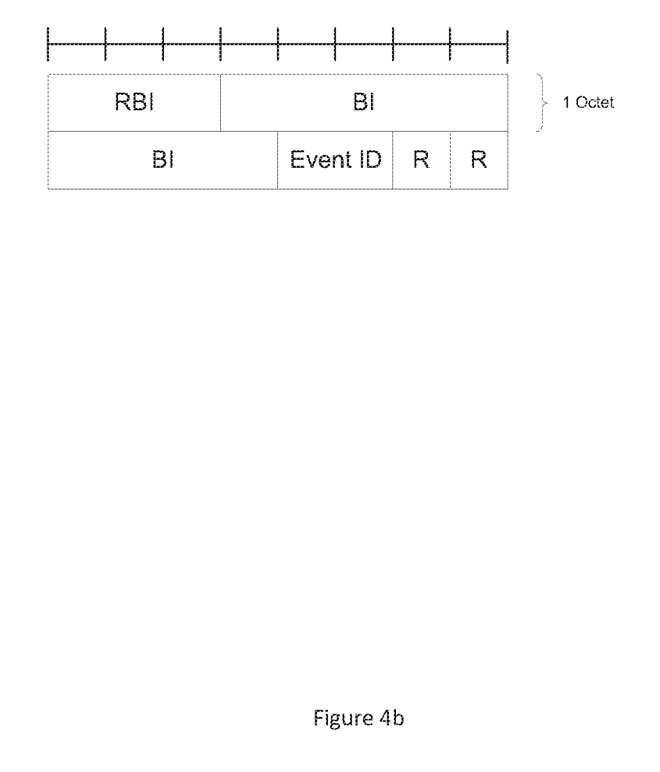
FIG. 4b illustrates a MAC CE providing a single beam index (BI) to refinement beam index (RBI) association and Event ID according to certain embodiments.
Figure 5:
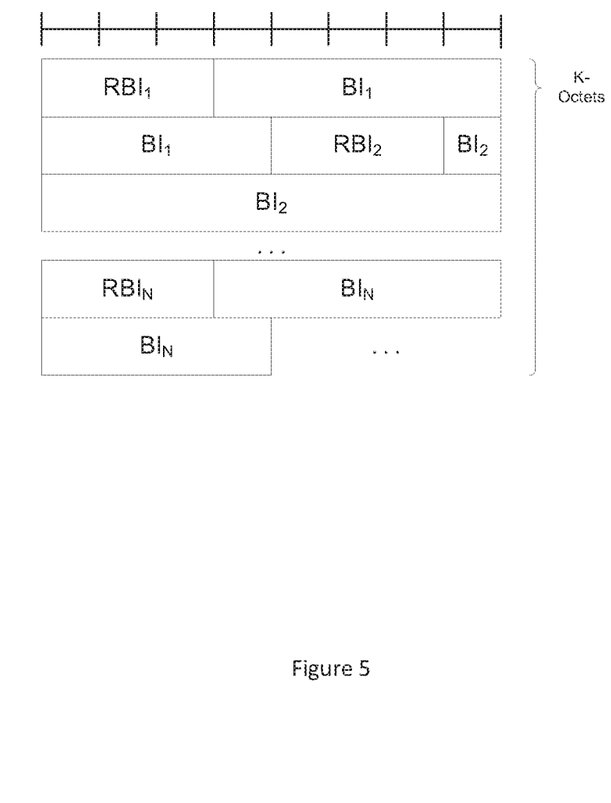
FIG. 5 illustrates a MAC CE providing N refinement beam indices to beam indices association, according to certain embodiments.

A MAC based beam change can be done in various ways. FIG. 4a illustrates a MAC CE providing a single beam index to refinement beam index association, according to certain embodiments. FIG. 4b illustrates a MAC CE with similar function as in FIG. 4a but with additional Event ID field. FIG. 5 illustrates a MAC CE providing N refinement beam indices to beam indices association, according to certain embodiments. Thus, for example as illustrated in FIG. 5, as a response to the beam refinement information (BRI) provided by UE, a network element can signal N association pairs of RBI-BI information. The network element may indicate a new serving beam or a set of serving beams by relying on the listing order in the MAC CE. The first listed RBI-BI association pair can indicate the new serving beam. The field sizes in the control element in the FIG. 5 are 3-bit RBI and 9-bit BI, but these are merely examples.

Alternatively, the network element may indicate the first M RBI-BI association pairs as the new serving set. To indicate a RBI-BI association, a MAC CE a specific logical channel identifier (LCID) value can be used.

In certain embodiments, when a UE has provided BRI feedback to the network, a timer (T1) is initiated. When the timer is running and has not expired any provision of logical Beam Index by network (via MAC CE) can associate the signaled BI to the highest quality RBI previously provided by the UE. When the timer is running, the UE may not perform beam tracking based on the serving beam. If the timer expires and the UE has provided BRI feedback and no change request is received, the UE can assume that the current serving beam is maintained and can continue beam tracking on the current serving beam.

In certain embodiments, the NW may indicate the mapping of RBI indices to beams in a specific group previously reported by UE. In case the network has selected beams transmitting the BRRS signals based on the UEs beam group information, such as BSI reporting, the NW may pre-map the BRRS resource indices to the logical beam indices prior to the transmission. For example, if the UE has indicated four beam indices in a group, the network may map these beam indices to BRRS resource indices. For example, the NW may map in a matching order: lowest value BI maps to lowest BRRS resource value or RBI index, or the lowest RBI index maps to the highest quality BI previously reported. The network may indicate this mapping by signaling a Beam Group Index MAC CE which conveys information of a beam group ID. With the pre-agreed/configured mapping rule, the UE can associate the beam indices of the signaled group with the RBI indices.

Likewise, a DCI based beam change can be done in various ways. If the UE has reported BRI information to the network by physical layer control signaling (PUCCH/PUSCH), the UE can initiate a timer (T2) at MAC layer for waiting for DCI indication of beam switch. If no beam switch indication is provided by the NW and the UE has previously reported BRI information and the timer expires, the UE can assume no serving beam change and can continue beam tracking at the MAC layer based on the previously indicated serving beam. If the timer has not expired and the UE receives a 1-bit indication in a DCI, ordering a beam switch, the UE can align the RX beam corresponding to the direction of a highest quality BRRS resource provided in the feedback and can suspend serving beam tracking during BRS periods until the network signals the MAC CE providing the association between BRI information and Logical Beam Indices by sending a MAC CE.

When DCI indication of a beam switch is received but no network indication of the association is provided and the timer expires, the UE may initiate a link recovery procedure. For example, the UE can trigger a BSI report, for example RACH/scheduling request (SR), or MAC CE. The UE may explicitly request the NW to signal the current serving beam.

The MAC CE may indicate a logical beam index or an association of RBI and BI. When the timer has not expired and the NW provides a beam change request, the MAC CE can associate the beam index to the RBI which was previously reported. After the association, the UE can resume the serving beam tracking at MAC layer.

Alternatively or additionally to timer based beam change by RBI BI association MAC CE, the control element may include additional field called 'Event ID'. This field may indicate different BRRS transmission events scheduled by BS. Event may signaled explicitly in the DCI message that is used to schedule BRRS resources. By referring to the Event ID when indicating a beam change, the UE can map this request to the correct measurement event. In one example, the BS may schedule multiple BRRS transmissions (different beams may be used) when the timer is running. Thus an event ID may be needed to associate the beam change to the correct measurement report event. Event ID may also be present in the BRI feedback report. Alternatively a timer may not be needed as new scheduling of new BRRS transmission with same Event ID overrides the BRRS feedback of the current Event ID and thus the potential beam change indication refers to the latest measurement/feedback in the ID. In other words, for example, if the UE has reported BRRS event ID 1, if the network again schedules the BRRS with event ID 1, the UE feedback can simply refer to the latest measurement results.

In certain embodiments, the signaling of an explicit beam index in a DCI message can indicate the beam switch. Alternatively, in certain embodiments, after sending BRI feedback, the NW can indicate the UE beam alignment to the highest reported BR-RSRP of an RBI index by indicating a logical beam index explicitly in the DCI message. This implicitly maps the UE RX direction corresponding to the highest reported RBI index to the logical beam index. The beam index may also be a partial beam index of N least significant bits. Also a specific DCI format may be used to signal this information. Alternatively a DCI message may have an indication when optional fields are present such as the explicit beam index.

In one scenario, a network may request a beam change by DCI (or MAC CE) to a specific logical beam index. It may be that this logical beam index has not been reported by the UE using BSI, or the UE has not recently reported BRI (and the timer has expired). In any of these scenarios, the UE can trigger a recovery procedure at the UE side. This recovery procedure may include triggering a BSI report. The BSI report may be based on the latest measurement, or the UE may wait for a new downlink sweep for measurement to provide more up-to-date information. The UE may use a Scheduling Request (or similar mechanism) to request resources for BSI reporting. Alternatively, an SR resource may be configured (e.g. to uplink sweep) to indicate this error scenario explicitly. RACH procedure may also be triggered as recovery.

Figure 6:
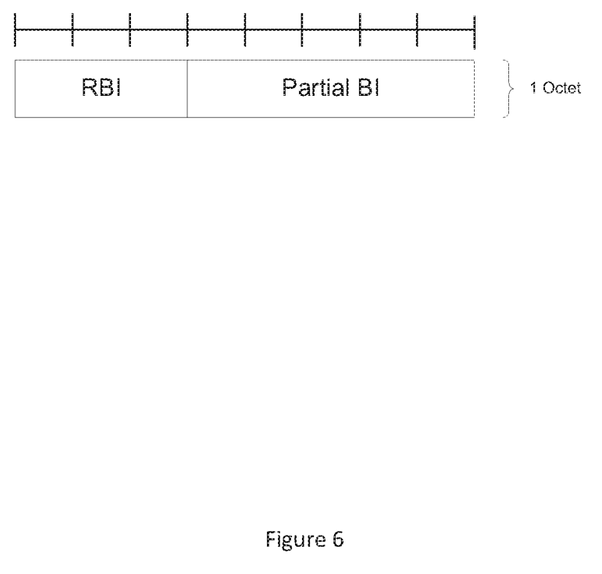
FIG. 6 illustrates a three bit RBI and five bit partial BI, according to certain embodiments.

FIG. 6 illustrates a three bit RBI and five bit partial BI, according to certain embodiments. In certain embodiments, as illustrated in FIG. 6, a partial logical beam index can be associated with an RBI index. The network may indicate, for example, N least significant bits of the logical beam index to UE. By using a partial BI value, the signaling can be done by using 1 octet MAC CE payload plus LCID. If the UE has previously reported a set of beams to be in a candidate set, the partial BI can refer to the full BI in the candidate set or in the sweep block UE previously/currently had/has a serving beam.

In certain embodiments the NW may configure the RBI/Beam index association semi-statically via, for example, RRC signaling. Other kinds of signaling of the association are also permitted.

The network can also indicate whether the association is valid for a certain BRI report. For instance, the NW may send the BRRS signals with different beam construction than the way the common control channels are beam formed. In this case the association between the BRI and BI may not be known to the NW, or the way in which the BRI and BI are visible in the UE may not be known.

In certain embodiments, the UE can determine a cell level measurement value by associating the beam measurements from the BRS and the beam measurements from the BRRS according to the association between the BRI and BI provided by the NW.

Figure 7:
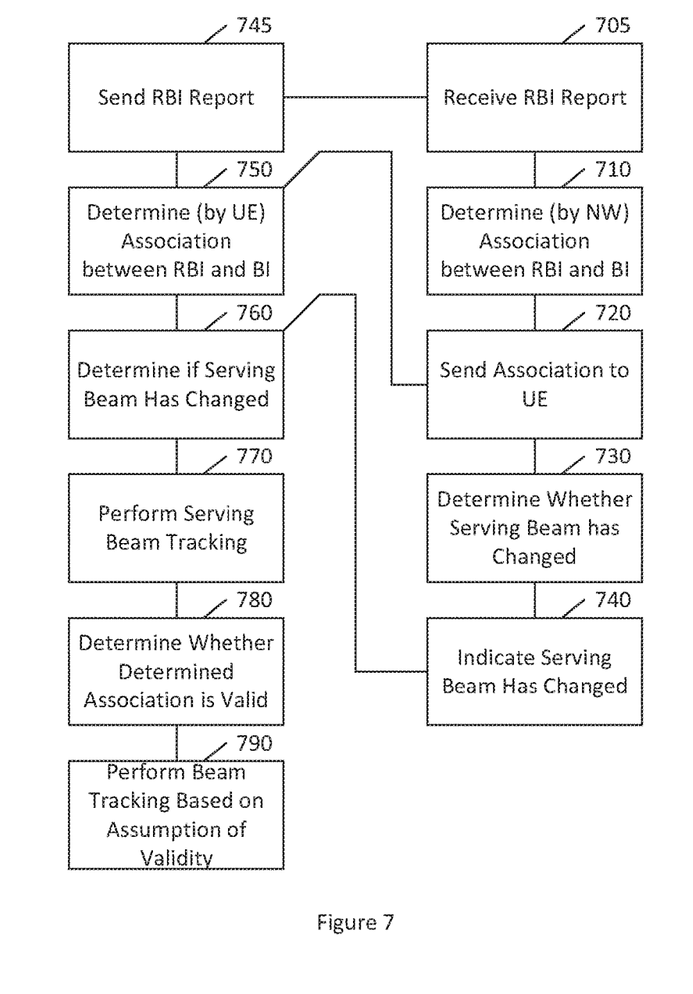
FIG. 7 illustrates a method according to certain embodiments.

FIG. 7 illustrates a method according to certain embodiments. As shown in FIG. 7, a method can include, at 710, determining, by an access node, an association between at least one reported refinement beam index and at least one logical beam index based on reception of a refinement beam index report. The refinement beam index report can be received at 705. The method can also include providing the association to a user equipment at 720.

The method can further include, at 730, determining whether at least one serving beam for the user equipment has changed. The method can also include, at 740, indicating to the user equipment that the at least one serving beam has changed, when a change is determined. This can be accomplished by, for example, sending a beam change to the user equipment.

The beam change can be indicated using at least one of a medium access control based beam change, a downlink control information based beam change, and radio resource control signaling based beam change, as described above.

The features at 705 through 740 may be performed by a network element, such as an access node. The other features described below may be performed by a user equipment.

For example, the method can also include, at 750, determining, by a user equipment, an association between refinement beam index and logical beam index based on information provided by the access node. The information can be the association provided by the access node at 720.

The method can also include, at 760, detecting if at least one serving beam has changed based on the determination. Thus, in certain cases, the information can be the beam change information provided at 740.

The method can include, at 770, performing serving beam tracking based on the determination. The serving beam tracking can also be based on the detection of the beam change.

The method can further include, at 780, determining whether the determined association is valid. The determining can be based on a timer set by the user equipment.

When the timer expires without receiving a beam change request from the access node, at 790 the method can include performing beam tracking assuming that a current serving beam is maintained.

The method can further include, at 745, sending a refinement beam index report to the access node, wherein the information provided by the access node is responsive to the refinement beam index report.

Figure 8:
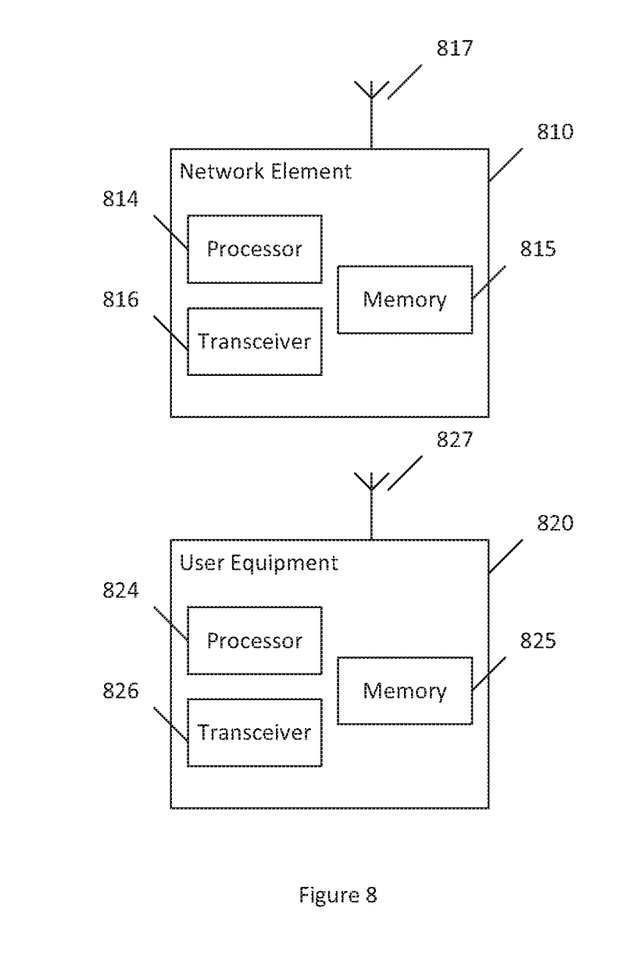
FIG. 8 illustrates a system according to certain embodiments.

FIG. 8 illustrates a system according to certain embodiments of the invention. It should be understood that each block of the flowchart of FIG. 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), or any other network element, such as a PCell base station or a PSCell base station. Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIG. 1.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor; and
   at least one memory including computer program code, wherein the at least one memory and the computer program code are configured to, with the at least one processor, cause the apparatus at least to:
   determine, at the apparatus, an association between refinement beam index and logical beam index based on information received from an access node;
   perform serving beam tracking based on the determined association; and
   determine whether the determined association is valid based on a timer set by the apparatus, wherein the timer is initiated after the apparatus has provided a beam measurement report to the access node.

2. The apparatus of claim 1, wherein the at least one memory and the computer program code are configured to, with the at least one processor, cause the apparatus further to:
   when the timer expires without receiving a beam change request from the access node, perform beam tracking assuming that a current serving beam is maintained.

3. The apparatus of claim 1, wherein the at least one memory and the computer program code are configured to, with the at least one processor, cause the apparatus further to:
   send a refinement beam index report to the access node, wherein the information received from the access node is responsive to the refinement beam index report.

4. The apparatus of claim 1, wherein an indication is received from the access node using at least one of a medium access control based beam change, a downlink control information based beam change, and radio resource control signaling based beam change.

5. The apparatus of claim 1, wherein the at least one memory and the computer program code are configured to, with the at least one processor, cause the apparatus further to:
   detect if at least one serving beam has changed based on the determined association.

6. The apparatus of claim 5, wherein the at least one memory and the computer program code are configured to, with the at least one processor, cause the apparatus further to:
   perform the serving beam tracking based on the detection.

7. A method, comprising:
   determining, by a user equipment, an association between refinement beam index and logical beam index based on information received from an access node;
   performing serving beam tracking based on the determined association; and
   determining whether the determined association is valid based on a timer set by the user equipment, wherein the timer is initiated after the user equipment has provided a beam measurement report to the access node.

8. The method of claim 7, further comprising:
   sending a refinement beam index report to the access node,
   wherein the information received from the access node is responsive to the refinement beam index report.

9. The method of claim 7, wherein an indication is received from the access node using at least one of a medium access control based beam change, a downlink control information based beam change, and radio resource control signaling based beam change.

10. The method of claim 7, further comprising:
    when the timer expires without receiving a beam change request from the access node, performing beam tracking assuming that a current serving beam is maintained.

11. The method of claim 7, further comprising:
    detecting if at least one serving beam has changed based on the determined association.

12. The method of claim 11, further comprising:
    performing the serving beam tracking based on the detection.

* * * * *